Dec. 4, 1951   M. J. STEFFES   2,577,043
TOOLHOLDER
Filed Dec. 23, 1946   2 SHEETS—SHEET 1

INVENTOR.
Milton J. Steffes.
BY
Harness, Dickey & Pierce.
ATTORNEYS.

Dec. 4, 1951    M. J. STEFFES    2,577,043
TOOLHOLDER
Filed Dec. 23, 1946    2 SHEETS—SHEET 2
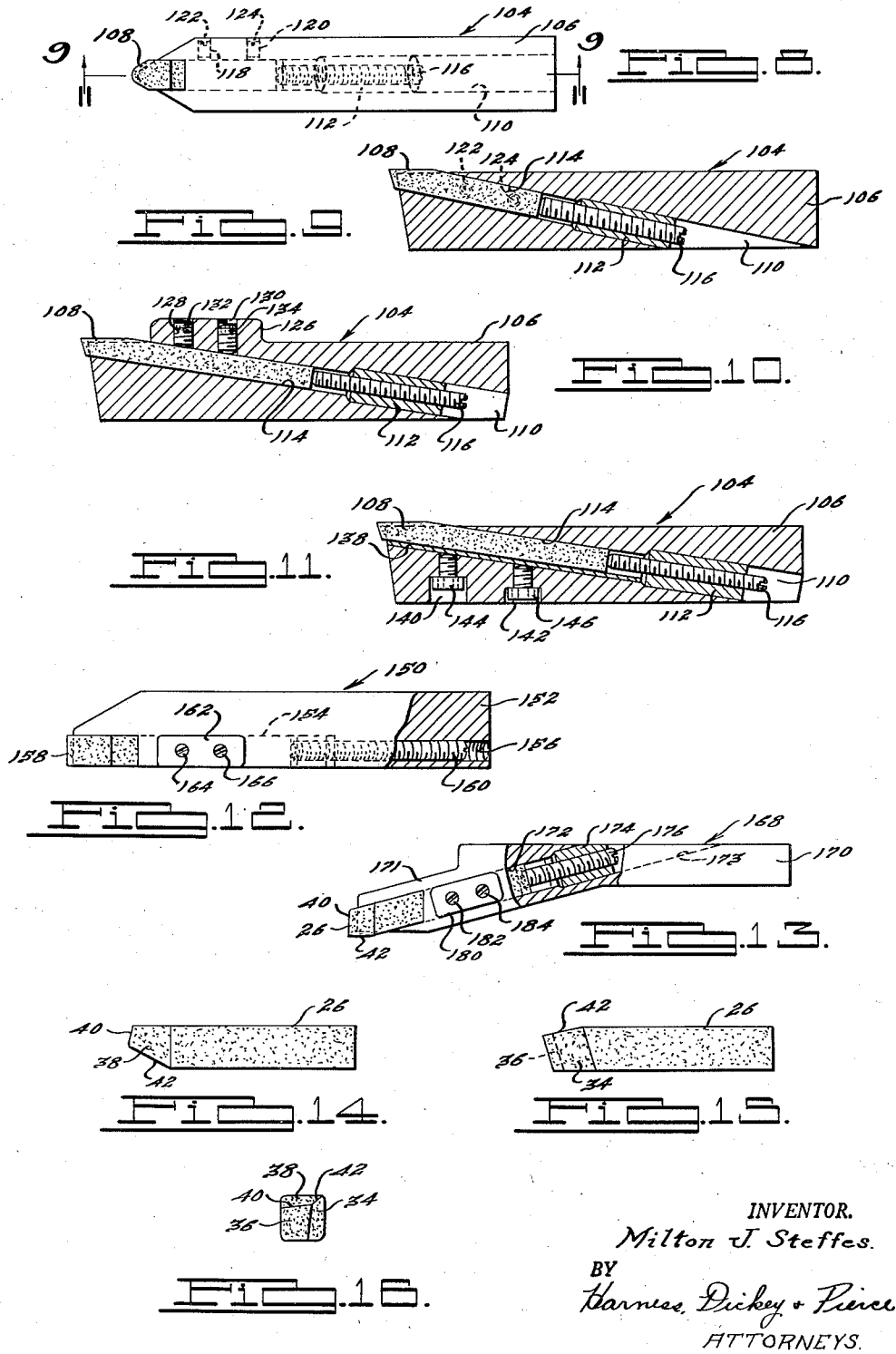
INVENTOR.
Milton J. Steffes.
BY
Harness, Dickey & Pierce.
ATTORNEYS.

Patented Dec. 4, 1951

2,577,043

UNITED STATES PATENT OFFICE 2,577,043

TOOLHOLDER

Milton J. Steffes, Dearborn, Mich., assignor to Super Tool Company, Detroit, Mich., a corporation of Michigan Application December 23, 1946, Serial No. 717,991

4 Claims. (Cl. 29—96)

This invention relates to adjustable machine tools and more particularly to a tool having a body portion for holding a bit having an end and two side faces which are advanced outwardly when the bit is shifted longitudinally, and constitutes an improvement of the application, Serial No. 608,522, filed August 2, 1945, and now Patent No. 2,418,734, granted April 8, 1947, for Adjustable Machine Tool, and assigned to the assignee of the present invention.

It has been the practice in the past to braze a cutting tip of hard material on a tool shank which is supported on a tool post or tool holder of a lathe or other cutting machine for adjustment to and from the work. The present invention contemplates the use of an inserted bit in a tool body disposed at an angle to the axis of the body both in a vertical and horizontal plane to have the end and side faces of the bit advance in three planes as the same is shifted longitudinally outwardly of the body so that the faces may be all dressed to reproduce the cutting edge. The inserted bit may be made of any material known to be suitable, such as, for example, tungsten carbide, Stellite and the like.

The tool body may be a single piece or composed of a number of pieces which may be assembled into a unit providing an aperture extending longitudinally thereof for receiving the tool bit. Maximum support is provided to positively and securely hold the tool bit in the tool body to materially reduce breakage. A backing up screw is provided in the aperture in the tool body by which the bit is advanced outwardly of the body when it is to be resharpened.

The projecting end of the bit is dressed in the usual manner to provide relief and rake to the cutting edge which may be of any form. When the cutting edge becomes dull, the clamping means for the tool bit is loosened and the backing up screw is adjusted to move the tool bit longitudinally outwardly in the aperture. After the bit is advanced, the clamping means is again tightened and the tool may then be dressed to have the cutting edges disposed in their former positions relative to the body.

Preferably the tool bit may be of square or rectangular form, and a like form is provided for a portion of the aperture in the tool body in which the tool bit is prevented from turning. However, the present invention is not intended to be limited by the shape of the tool bit or the aperture inasmuch as it will be obvious to those skilled in the art that the bit and the receiving aperture may be of any shape so long as the bit is prevented from rotating therewithin.

It is, therefore, the primary object of the present invention to provide an adjustable machine tool having a body portion which is supported in a tool post or holder of a machine having means for adjustably supporting a tool bit in such manner as to have its end and two side faces advanced outwardly when the bit is adjusted outwardly of the body.

Another object of the present invention is to provide a machine tool of the class described in which the tool bit is rigidly and positively supported so that it may be adjusted to make deep cuts without damage to the tool bit.

A still further object of the present invention is to provide a holder for supporting a replaceable tool bit to thereby materially increase the useful life of the tool holder.

A further object of the present invention contemplates the provision of a machine tool in which internal strains due to the bonding of the cutting bit to the body are substantially eliminated.

Other objects and features of novelty of the invention will be specifically pointed out or will become apparent when referring, for a better understanding of the invention, to the following description taken in conjunction with the accompanying drawings, wherein:

Fig. 8 is a plan view of still another embodiment of the present invention;

Fig. 9 is a sectional view of the structure illustrated in Fig. 8, taken on the line 9—9 thereof;

Fig. 10 is a sectional view of structure, similar to that illustrated in Fig. 9, to show another means of holding the tool bit in the body of the tool illustrated in Fig. 8;

Fig. 11 is a sectional view of a structure, similar to that illustrated in Fig. 9, showing still another means for holding the tool bit in the body of the tool illustrated in Fig. 8;

Fig. 12 is a plan view of one form of offset tool;

Fig. 13 is a plan view of another form of offset tool embodying the improvements of the present invention; and Figs. 14, 15 and 16 are, respectively, plan, side elevational and end elevational views of a tool bit suitable for use in the machine tool of the present invention.

Figure 1:
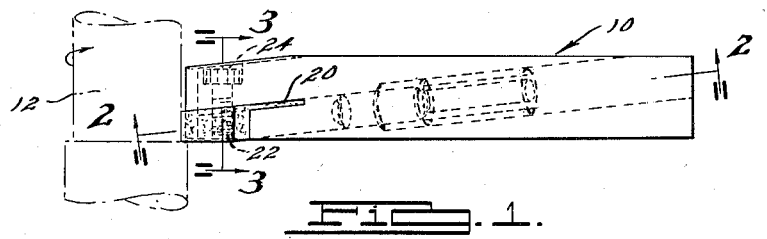
Figure 1 is a plan view of an adjustable machine tool embodying the improvements of the present invention.
Figures 2, 3:
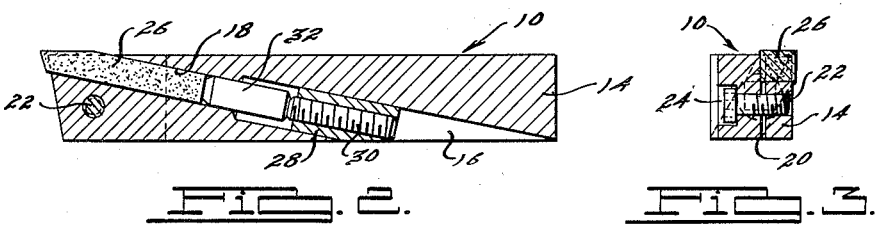
Fig. 2 is a sectional view of the structure illustrated in Fig. 1, taken on the line 2—2 thereof.
Fig. 3 is a sectional view of the structure illustrated in Fig. 1, taken on the line 3—3 thereof.

Referring to Figs. 1 through 3, a tool 10 is illustrated as being mounted on a machine (not shown) and in position to perform a cutting operation on a piece of work 12 mounted on the machine. The tool 10 comprises a body member 14 having an aperture therein which consists of a lower counterbored portion 16, preferably annular in form, and a forward portion 18 which is preferably square or rectangular in form, produced by broaching or like operation. As may be seen in Fig. 2, the aperture is disposed at an angle to the horizontal length of the body 14 both downwardly and crosswise of the body. The aperture may be formed by initially drilling through the body 14 an angularly disposed aperture of a diameter somewhat less than the size of the broach to be later drawn therethrough. The portion 16 of the aperture is thereafter counterbored to the required diameter, after which the portion 18 is broached or otherwise machined to desired form. At the end of the body 14 in which the formed portion 18 is provided, a slot 20 is machined to have one side coincide with the side wall of the portion 18. A counterbored threaded aperture 22 is provided through the forward end of the body 14 with the counterbored portion on one side of the slot 20 and the threaded portion on the other. A screw 24 disposed in the aperture 22 draws the portions of the body on each side of the slot toward each other to securely clamp a tool bit 26 in the aperture 18 of the body.

After the portion 16 of the aperture in the body 14 is formed by counterboring, a sleeve 28 is inserted in the opening 16 and brazed or otherwise secured therein. The sleeve is tapped prior to or after the brazing operation for receiving a screw 30 which is threaded therein against the lower end of a filler plug 32 disposed between the screw 30 and the bit 26. The screw 30 backs up the bit and produces its advancement from the end of the body 14 when sharpening is required. After the bit 26 is adjusted in this manner in the body 14, the screw 24 is tightened to draw the split ends of the body 14 toward each other to thereby tightly hold the bit 26 in position.

The bit 26, as may be seen in Figures 14, 15 and 16, is provided with the ground side faces 34 and 36, as well as a ground face 38 on its upper edge. The bit 26 is square in cross-sectional form and the faces thereon, which are ground at compound angles, intersect to form cutting edges 40 and 42. The faces 34, 36 and 38 being ground at compound angles provide relief for the cutting edge disposed at an angle in the body 14. It will be observed in Figure 14 that the edge 42 is angularly disposed with respect to the adjacent side of the bit 26, this angle being complementary to the angle at which the bit is disposed in the holder 14 with respect to a side thereof when viewed in the plan form. When the bit 26 is mounted in the aperture of the body 14, the cutting edge 42 is parallel to the edge of the body 14 and the cutting edge 40, which is disposed normal to the cutting edge 42, is disposed parallel to the adjacent end of the body 14. Should the cutting edges 40 and 42 become dulled through use, it is only necessary to loosen the screw 24 and extend the bit 26 a desired amount by adjusting the screw 30, after which the screw 24 may be again tightened and the cutting portions of the tool bit 26 dressed to their original positions to sharpen the cutting edges.

As may be seen in Figure 15, the face 36 is also formed at an angle to the vertical and is slightly greater, in the order of about 5°, than the angle at which the tool bit 26 is disposed with respect to the vertical in the holder 14. In this manner, there is sufficient rake provided for relief during a cutting operation.

Figures 4, 5:
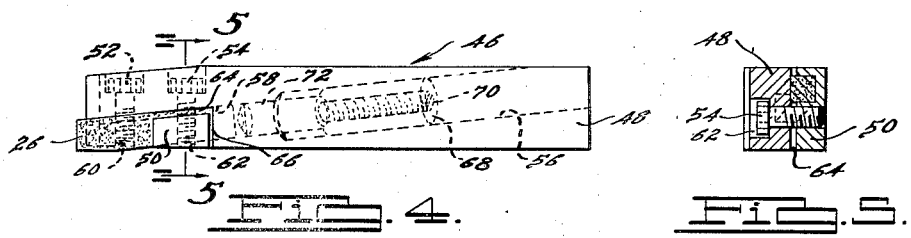
Fig. 4 is a plan view of another form of the adjustable machine tool of the present invention.
Fig. 5 is a sectional view of the structure illustrated in Fig. 4, taken on the line 5—5 thereof.

In Figs. 4 and 5, a tool 46 is illustrated having a two-piece body consisting of members 48 and 50 which are secured together by screws 52 and 54. An aperture is formed in the body portion of the tool 46, disposed at an angle to the longitudinal length of the body both in the horizontal and vertical planes, consisting of a counterbored portion 56 and a broached portion 58 of square, rectangular or like form for supporting a tool bit 60 in a manner to prevent rotation.

After the body member 48 has been formed and an aperture drilled therethrough, a portion of the aperture is broached to produce the broached opening 58 and the adjacent portion is counterbored to produce the enlarged annular opening 56. Apertures 60 and 62 are then drilled through the body and the portion 50 is separated therefrom by sawing along one side of the broached opening 58, as at 64, and further sawing the body normal to the slot 64 to provide the cut along the line 66. The removable portion 50 has the apertures 60 and 62 therethrough threaded for receiving the threaded end of the screws 52 and 54 which draws the separate portion 50 against the bit 26 to secure it in position. A cylindrical member 68 is brazed in the counterbored portion 56 and drilled and tapped before or after brazing for receiving a screw 70 which may directly back up the bit 26 or engage a back-up element 72 to secure the bit 26 against movement inwardly of the body portion. When the screws 52 and 54 are loosened, the bit may be adjusted outwardly by adjusting the screw 70 so that the bit may be dressed to have its cutting edges disposed in the same position relative to the body as originally had before the dressing operation.

Figures 6, 7:
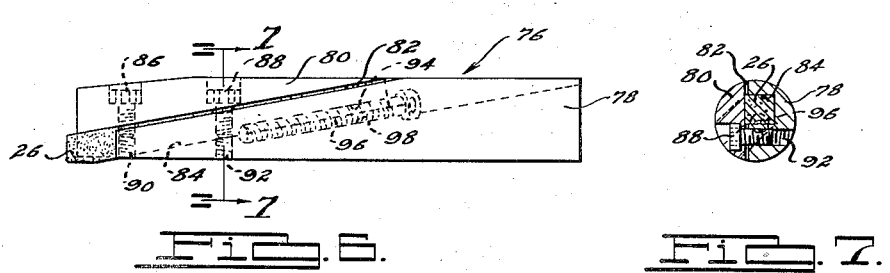
Fig. 6 illustrates another embodiment of the present invention in which an annular cylindrical two-piece tool body is illustrated.
Fig. 7 is a sectional view of the structure illustrated in Fig. 6, taken on the line 7—7 thereof.

A further form of tool 76 is illustrated in Figs. 6 and 7 having a square or cylindrical body consisting of separable pieces 78 and 80. In the drawing, the body is illustrated as being cylindrical in form with separate pieces joined along a diagonal line 82 conforming to the angular position of the bit 26 in the body. A slot 84 is milled in the diagonal face of the body 78 for receiving the bit, and a pair of screws 86 and 88 in apertures in the body portion 80 are threaded into tapped apertures 90 and 92 in the body portion 78. The bit 26 is provided with a portion of a thread 94 which is disposed in engagement with the thread on a screw 96 retained against longitudinal displacement in an aperture 98 disposed parallel to the slot 84 and in communication therewith. When the screws 86 and 88 are loosened, the adjustment of the screw 96 advances or retracts the bit 26 relative to the body 76, after which the bit is securely held in position by the tightening of the screws 86 and 88. The screw 96 is held against longitudinal movement and when rotated in either direction will produce the movement of the bit either outwardly or inwardly of the body portion.

In Figs. 8 and 9, a further type of tool 104 is illustrated, having a body 106 for supporting a round-nosed tool bit 108 in a broached aperture 114 angularly disposed with respect to the horizontal. In a counterbored extension of the aperture 110, a threaded bushing 112 is brazed or otherwise secured for supporting a back-up screw 116 which retains the bit 108 adjusted axially within the slot 114. The bit is retained in position thereafter by a pair of screws 122 and 124 disposed in threaded apertures 118 and 120 in the side of the body 106 in communication with the slot 114.

In Fig. 10, a similar tool 104 is illustrated having a boss 126 extending from the top surface of the body portion thereof containing threaded apertures 128 and 130 in which clamping screws 132 and 134 are employed for clamping the bit downwardly against the bottom of the slot 114.

In Fig. 11, a further form of tool 104 is illustrated, that wherein the bottom of the slot 114 is provided with a clamping plate 138 which is engaged by screws 144 and 146 disposed in apertures 140 and 142 for clamping the plate 138 and the bit 108 against the top of the broached aperture 114.

In Fig. 12, a tool 150 is illustrated having a body 152 provided with an angularly disposed slot 154 in a side face thereof for receiving a tool bit 158. A threaded aperture 156 is provided in extension of the slot in the body 152 containing a screw 160 which engages the end of the bit for adjusting it in the slot 154 and backing it up after it is clamped therein by a pair of screws 164 and 166 threaded in a boss 162 in the top of the body 152, the same as the boss 126 on the tool body 106 of Fig. 10.

In Fig. 11, an offset type of tool 168 is illustrated, wherein the body 170 has an angularly disposed portion 171 in which a slot 172 is broached at an angle to the top face of the portion 171. The aperture is counterbored at 173 and provided with a threaded boss 174 which is brazed or otherwise secured therein for supporting a back-up screw 176 which adjusts the bit 26 in the aperture 172 and backs up the bit when it is clamped within the slot by the screws 182 and 184 extending downwardly in a boss 180 on the portion 171, the same as the bit 126 is provided on the body of the tool 106 of Fig. 10. Relative to the main body portion 107, the bit is adjusted upwardly and outwardly each time it is moved outwardly in the slot 172 so that both its end edge 40 and its side edge 42 are adjusted outwardly. Thereafter, these edges may be ground to produce sharp edges disposed in the position had prior to the adjusting and grinding operations.

In the tools herein illustrated, the body portion is so constructed as to have the bit tightly clamped and backed up therein. In various tools the adjustment of the bit in the body portion shifts the cutting edges outwardly so that, after a dressing operation, the edges will be disposed in the same position had prior to the adjusting operations. The bit 26 illustrated in Figs. 14, 15 and 16 has the cutting edges 40 and 42 so disposed thereon that when positioned within the slot in the holder, the edges will be disposed in cutting position. The faces of the bit adjacent to the cutting edges are disposed at an angle conforming to the angular position of the slot in the body portion plus an additional angle of substantially 5° to provide for rake and relief. When the angle of the slot disposed in the tool body is 15° to the horizontal and vertical planes, then the angle of relief and rake to the cutting edges 42 and 40 will be 20° so as to include the 5° relief angle when the bit is mounted in the tool body and presented to the work in cutting relation therewith. In other words, the top face will slope 15° from the top surface, which sloping will have a 5° rake from the cutting edge. Similarly, the face below the cutting edge 42 will slope 15° from the side of the body and will have a 5° relief angle added across the face from the cutting edge. Similarly, the end face 36 will be disposed at 15° to the end face and have a 5° relief angle added thereto from the cutting edge 40.

What is claimed is:

1. A solid tool body having an aperture of polygonal cross section extending angularly therethrough and having an enlarged cylindrical portion near one end in extension thereof and in communication therewith, a cylindrical bushing secured in said enlarged end after having been inserted therein from said end, said bushing having a threaded aperture, a threaded screw disposed in said last aperture for adjusting a bit in said first aperture, and clamping means for relatively drawing parts of said body toward each other to clamp a bit in the first said aperture.

2. In an adjustable machine tool, a solid tool body having an aperture of polygonal cross section extending angularly therethrough and having an enlarged cylindrical portion near one end in extension thereof and in communication therewith, a cylindrical bushing secured in said enlarged end after having been inserted therein from said end, said bushing having a threaded aperture extending longitudinally thereover, a threaded screw disposed in said last aperture, a bit disposed in said first aperture forwardly of the bushing in position to be adjusted by the screw therein, means for clamping the bit within said first aperture, said means embodying a slot in said body through said aperture, and a screw extending through the slotted portion of the body for relatively drawing the portions together to secure said bit within the aperture.

3. A solid body having an aperture of polygonal cross section disposed at an angle therethrough, a slot in the body extending through a portion of said aperture, the end of the remaining portion of the aperture having a greater cross-sectional area, a bushing brazed in the portion of the aperture of greater cross-sectional area, said bushing having a threaded aperture longitudinally thereof, a screw in said threaded aperture for backing up an adjusting bit of polygonal cross section in said polygonal aperture portion, and a screw extending through the body at the slotted portion thereof for relatively drawing the separated portions toward each other for clamping the bit within the aperture.

4. In an adjustable machine tool, a body having at its forward end an aperture of polygonal cross section disposed therein at an angle to the vertical and horizontal planes and at its rearward end a cylindrical aperture in aligned communication therewith, a tool bit disposed in the forward end of said aperture, a cylindrical bushing disposed in the rearward end of said aperture, said bushing having a threaded aperture longitudinally thereof, an adjusting screw secured in the thread of the bushing, the forward portion of the body having a deflectable portion at said aperture, and a screw for drawing said deflectable portion toward the adjacent body portion for clamping a bit within the aperture.

MILTON J. STEFFES.

REFERENCES CITED

The following references are of record in the file of this patent:

UNITED STATES PATENTS

| Number | Name | Date |
|---|---|---|
| 725,019 | Armstrong | Apr. 14, 1903 |
| 966,585 | Nielson | Aug. 9, 1910 |
| 1,011,667 | Taylor | Dec. 12, 1911 |
| 1,304,898 | Martin | May 27, 1919 |
| 2,216,788 | Severson | Oct. 8, 1940 |
| 2,353,079 | Rice | July 4, 1944 |
| 2,360,137 | Jennings | Oct. 10, 1944 |
| 2,418,734 | Steffes | Apr. 8, 1947 |

OTHER REFERENCES

American Machinist, May 14, 1931, pages 755 through 757.